[11] 3,631,625

[72] Inventor Charles S. Castner
 Reading, Pa.
[21] Appl. No. 863,602
[22] Filed Oct. 3, 1969
[45] Patented Jan. 4, 1972
[73] Assignee Schuyler Development Corporation

[54] FISHING LURES
 6 Claims, 4 Drawing Figs.
[52] U.S. Cl.................................................... 43/42.33,
 350/158
[51] Int. Cl............................................... A01k 85/00
[50] Field of Search.......................................... 43/42.33;
 350/157, 158, 159; 40/130 A

[56] References Cited
UNITED STATES PATENTS

| | | | |
|---|---|---|---|
| 2,535,781 | 12/1950 | Burchell....................... | 350/158 |
| 2,122,853 | 3/1964 | Koonz et al.................. | 43/42.33 X |

*Primary Examiner*—Samuel Koren
*Assistant Examiner*—Daniel J. Leach
*Attorney*—Buell, Blenko & Ziesenheim ABSTRACT: A fishing lure is provided having a body of clear cast plastic or clear, flexible and resilient latex surrounding a central birefringent film having crossed polarizing films on the opposite sides thereof. The lure may be in the shape of a minnow, frog or similar natural object or in the form of a spinner.

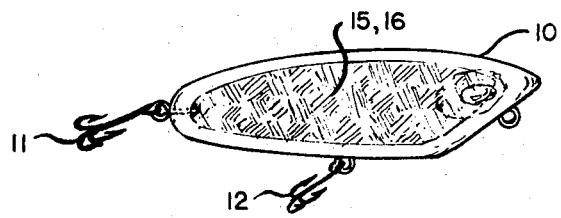
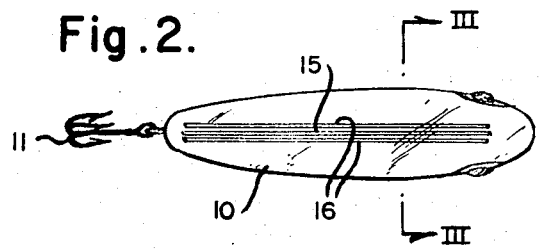
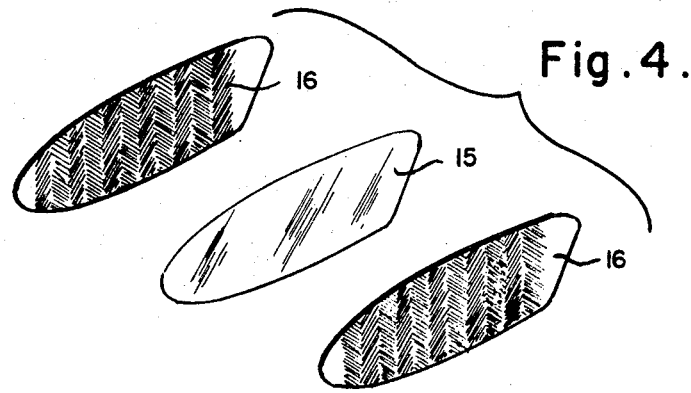
INVENTOR
Charles S. Castner

FISHING LURES

This invention relates to fishing lures and particularly to an iridescent or color-changing fishing lure which gives the impression of a moving minnow or the like with changing light patterns as the lure moves in the water. Many different fishing lures have been proposed for the luring of fish in substitution for natural bait, such as minnows, frogs, worms and the like. One of the best lures for most game fish is the natural minnow and many attempts have been made to provide a lure which would, while traveling in the water, give the effect of a live minnow. For example, bodies shaped like minnows have been painted in multicolored patterns in a variety of different types of paints and finishes in an effort to give them the changing pattern of color which a natural minnow possesses in the water, but with less than the hoped for success.

The present invention provides an artificial lure which is highly attractive to fish and which appears to give the changing color patterns which are characteristic of the natural minnow or other natural food moving through water in sunlight. This is accomplished in my lure by polarizing the natural light which is in the water and taking advantage of the birefringent properties of certain plastic substances used in connection with polarizing films to give a unique changing pattern of color.

Preferably, I provide a clear plastic lure body shaped in a desired configuration. Within the body, I provide a pair of spaced polarizing films separated by a birefringent material such as cellophane and having hooks attached to the body at selected positions. Preferably, the polarizing film is made up of a plurality of small pieces of film side by side at different angles of polarization. This can preferably be formed by placing side-by-side pieces of polarizing film on opposite sides of the birefringent sheet and then cutting a desired piece for incorporating within the clear plastic body of the lure. Preferably, the body is cast of clear plastic around the central pieces of polarizing film having a birefringent sheet sandwiched between them.

In the foregoing general description I have set out certain objects, purposes and advantages of my invention. Other purposes, objects and advantages will be apparent from a consideration of the following description and the drawings in which:

FIG. 1 is a side elevation of a fishing lure according to my invention;

FIG. 2 is a top plan view of a fishing lure according to my invention;

FIG. 3 is a section on the line III—III of FIG. 2; and

FIG. 4 is an exploded view of the birefringent material and a pair of polarizing films used in my invention.

Referring to the drawings, I have illustrated a fishing lure having a body 10 of cast clear plastic to which is attached a pair of gang hooks 11 and 12 as is usual in fishing lures of this type. Within the cast body of the lure, I provide a central birefringent layer 15 of a material such as cellophane. On each side of the birefringent material I provide a sheet of polarizing material 16, each sheet being made up of small segments of polarizing film, each segment lying at a different angle from the one next adjacent to it as illustrated more clearly in FIG. 4. Preferably, the birefringent film or layer 15 is assembled with the two polarizing films 16, which on each side, and placed in a mold around which the clear plastic body 10 is cast to form the final fishing lure.

When there is relative change of position between the fish and lure such as when the lure moves with respect to incident light, or the fish moves with respect to the lure, the pattern of color changes rapidly giving the lure an iridescent flash characteristic of a live minnow, bait fish, frogs and insects. Such a lure is very attractive to fish and I have found that the lure is capable of taking fish consistently day after day where conventional lures are unsuccessful or where they are only partially successful on one day out of a number of days. This consistency of fish taking appears to support my belief that the changing pattern of light resulting from the polarizing effect gives to the lure the iridescent flashing characteristic of certain insect wings, the natural minnow, and bait fish bodies, and makes it highly attractive to all species of game and rough fish. In any event, it is consistently attractive to fish to a greater degree than any other lure known to me.

The body may be made of clear plastic or of clear, flexible resilient latex surrounding a central birefringent film having crossed polarizing films on the opposite sides thereof.

While I have illustrated and described a presently preferred embodiment of my invention in the foregoing specification it will be obvious that this invention may be otherwise embodied within the scope of the following claims.

I claim:

1. A fishing lure comprising a clear transparent solid body sealingly enclosing side by side a birefringent film and a polarizing film therein.

2. A fishing lure as claimed in claim 1 wherein the said birefringent film has crossed polarizing films on each side thereof extending lengthwise of the body.

3. A fishing lure as claimed in claim 1 in the form of a minnow wherein the said birefringent film has crossed polarizing films on each side thereof extending lengthwise of the body, centrally thereof.

4. A fishing lure as claimed in claim 3 wherein each of the polarizing films is made up of separate pieces of polarizing film side by side at different angles of polarization.

5. A fishing lure as claimed in claim 3 wherein each of the polarizing films has parts with random orientation of polarizing angles.

6. A fishing lure as claimed in claim 1 in the form of a spinner wherein the said birefringent film has crossed polarizing films on each side thereof extending lengthwise of the body, centrally thereof.

* * * * *

UNITED STATES PATENT OFFICE
CERTIFICATE OF CORRECTION

Patent No. 3,631,625          Dated January 4, 1972

Inventor(s) Charles S. Castner

It is certified that error appears in the above-identified patent and that said Letters Patent are hereby corrected as shown below:

In the references, "2,122,853" should read -- 3,122,853 --.

Column 2, line 7, "which" should read -- one --.

Signed and sealed this 24th day of October 1972.

(SEAL)
Attest:

EDWARD M. FLETCHER, JR.
Attesting Officer

ROBERT GOTTSCHALK
Commissioner of Patents